April 8, 1924.　　　　　　　　　　　　　　　1,489,988
F. W. DICKINSON
CINEMATOGRAPH APPARATUS
Filed March 21, 1923　　2 Sheets-Sheet 1
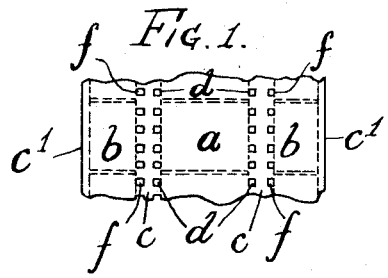
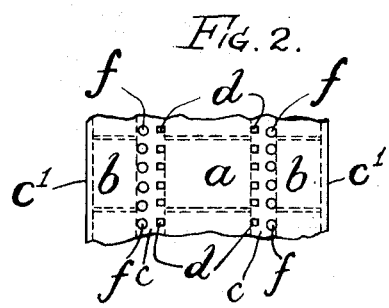
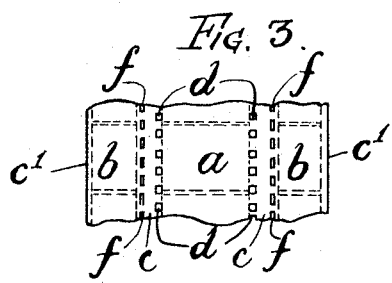
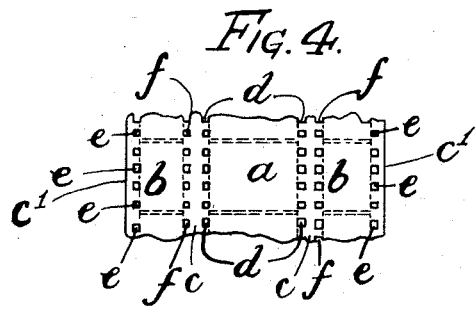
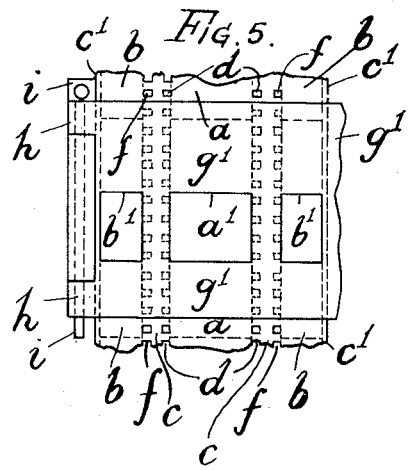
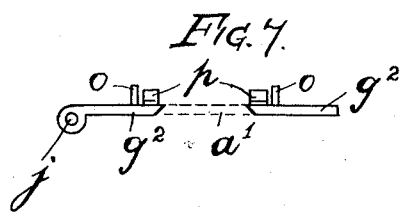
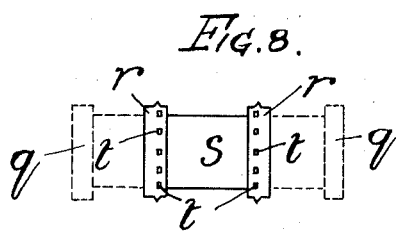

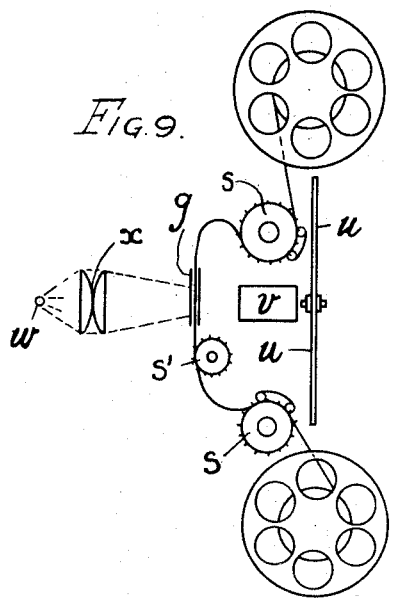
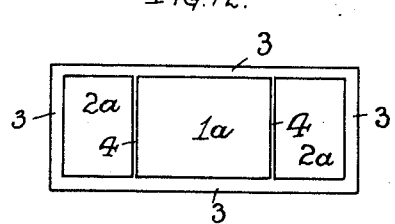
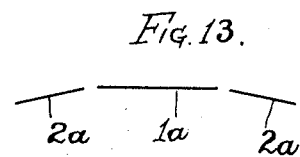
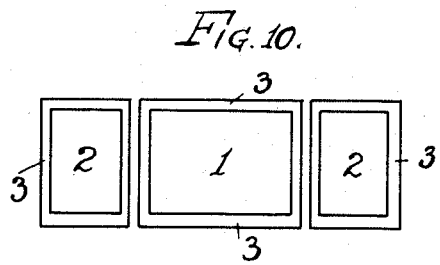
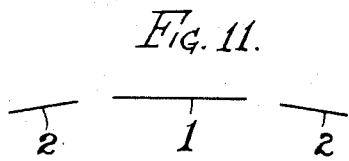
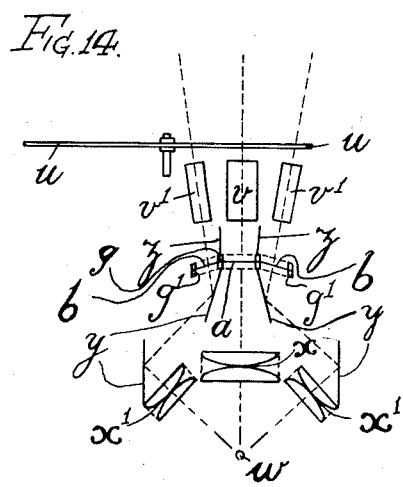

Patented Apr. 8, 1924.

1,489,988

UNITED STATES PATENT OFFICE.

FREDERIC WILLIAM DICKINSON, OF LEEDS, ENGLAND.

CINEMATOGRAPH APPARATUS.

Application filed March 21, 1923. Serial No. 626,612.

*To all whom it may concern:*

Be it known that I, FREDERIC WILLIAM DICKINSON, residing at 14 Zermatt Street, Chapel Allerton, in the city of Leeds and county of York, England, have invented new and useful Improvements in or Relating to Cinematograph Apparatus, of which the following is a specification.

This invention relates to cinematograph apparatus.

With the ordinary cinematograph apparatus such as used in picture houses and like places the width of the single rank of pictures on the ordinary one inch and three-eighths of an inch wide standard film does not exceed one inch, each field of view being thus correspondingly limited and usually necessitating frequent changing of the picture scenes; also as each sub-title employed usually needs most of the screen for its effective display, various such titles often have to be made use of between picture records, resulting, when projected, in the flow or succession of the pictures being more or less frequently interrupted thereby.

The object of this invention is to provide means or apparatus whereby centre or main cinematograph pictures and narrower wing or side pictures can simultaneously be exhibited together side by side from the same film and preferably so near together as to appear on the screens almost as one wide moving picture, or whereby the centre or main cinematograph pictures may be accompanied by frequent short side dialogue or other important reading matter from the same film and without interrupting the flow or succession of the main pictures.

Broadly speaking this invention consists in combining with an ordinary positive standard cinematograph film two lineal wing or side strips,—one on each side of the film,—each bearing narrow wing or side records adapted to me projected alongside, but separate from, and at an angle to, the centre or main records, and in the provision or adaptation of projection means therefor. The said film is hereinafter termed "the improved film" and it is made wide enough to carry,—in addition to a rank of ordinary standard width picture records,—two wing or side ranks of narrow pictures, dialogue, or other cinematographic matter adapted to be projected directly upon the wing or side screens. The improved film thus comprises a centre or main record-bearing part or rank of picture or other records of about ordinary standard width, and it also comprises two wing or side record-bearing parts or ranks, each of a less width than the main rank, and with or without non-recording spaces between the successive pictures or other records. The said ranks are separated by pressure-guide or running parts, there being preferably a perforated or non-perforated pressure or running part at or near each edge of the improved film. Along each side of the main rank of records are perforations,—hereinafter termed the "driving perforations",—by which the film can be moved or registered, and which are of about the usual standard size, pitch and separation as in an ordinary standard film, and also between the ranks but nearer to the side ones are perforations, slits, slots, or the like,—all hereinafter termed and included in the term "flexing perforations",—by which the improved film is more particularly characterized and which are adapted to allow of or to facilitate slight flexing or turning of the wings or side record parts of the improved film to permit that at the moment the wing or side records are projected the said wing or side record parts of the film may be suitably facing towards and directly projectable upon the wing or side screens. The flexing perforations may be of the same shape, size and pitch as the standard driving perforations, or, if so desired they may be varied as circumstances require.

The projector for the improved film,—which may be used in combination therewith,—will differ from an ordinary cinematograph projector mainly in so far as is necessitated by the improved film and its projection differing from the ordinary standard film, and it will comprise the driving mechanism, and in some cases also an intermittent mechanism which may be of any convenient and suitable construction, as, for example, such as used in projectors employed in picture houses or like places for projecting ordinary standard films, but the gate in this case will require to be a three-apertured one, which together with the film track, guides and film-accommodating parts of the machine are, where necessary, made suitably wider than for ordinary standard film. The three gate apertures are arranged to be side by side, and preferably they are of equal height and are arranged on or about the same level with each other, but the two side apertures are each of a less width than the centre or main aperture. Three separate projection lenses are employed, each lens being adjustably mounted or supported in front of its respective gate aperture, the two side lenses being each set or employed at the required angle for projecting directly upon their corresponding wing or side screens.

To momentarily and suitably angle or turn the wing or side record-bearing parts of the improved film a little at the flexing perforations when the said film is passing through the gate, and so that when within the side gate apertures the wing or side record-bearing parts of the film suitably face towards the respective side projection lenses and the corresponding side screens, fixed or movable guide pieces or like,—adapted to suitably bear against or to guide the edge or side parts of the improved film,—are employed in or in connection with the side-apertured parts of the gate, and the said guide pieces are additional to known or other suitable guide-pieces or like, which act alongside the main rank of records as in projectors for ordinary standard films. If desired small intermediate guide or flattening pieces may be employed above and below the two side gate-apertures. Both the gate and its door may be straight or parallel, or the side-apertured parts of either or both of them are made or set at an angle to the main-apertures parts. If desired the side-apertured parts of the gate and also of the gate door, may be angularly adjustable in any convenient and suitable manner.

In some cases, and so that the projector may also be employed for projecting ordinary standard films, its triple-apertures door is arranged to be detachable, say, by the withdrawal of a hinge-pin or by the removal of screws or other fixings, and there is provided another gate door having a main gate-aperture together with guide or like pieces suitable for ordinary standard film, and the said door is adapted to be substituted for the triple-apertured door when an ordinary standard film is to be projected by the centre projection-lens upon the main screen.

Interchangeable film-guides or guide-fitted spool cases may also be provided if necessary or desired.

The picture screens comprise a main screen and two separate wing or side screens, or, more preferably, there may be employed what can be termed a wide screen, which is so divided by vertically-arranged intermediate borders or the like as, in effect, to form a main screen and two separate narrower side screens. In either case the said side screens are both formed, set or employed at an angle to the main screen so that they will suitably face towards the respective side projection lenses and the corresponding side-gate apertures of the projector.

The screens are preferably separated by comparatively narrow intermediate borders or the like, sufficiently wide, say, for nearly-meeting edges of side by side pictures to suitably border upon, but yet narrow enough to allow of a centre picture and two narrower side pictures visually appearing almost as one wide moving picture.

The gate apertures of the projector, or the records when therein, are illuminated in any convenient and suitable manner, as, for example, say, by or from an arc or other source of light employed within a lantern provided with a main condenser, and also with angularly-placed side condensers, the light from the latter being directed to the respective side gate apertures by side reflectors.

The improved film is produced in any convenient and suitable manner, as, for example, say, it may be printed from a negative film of similar width bearing side by side pictures taken in a camera provided with three side by side lenses together with a triple-apertured gate fitted with side film-flexing guide pieces and otherwise constructed on the principle of the herein described projector. Or, the main rank part of the improved film may be printed from ordinary standard negative film, and its side record parts printed from narrow negative films, or from a wider film bearing side negative records only.

If desired the improved film is printed from a negative film from which side picture portions have been removed and for which have been substituted portions of other film bearing dialogue or other important words. Also, if desired the last few records of side by side picture combination scenes and the first few record parts of other such scenes may be stepped or interjoined together so that scene-changing on the screens is advantageously effected.

Side by side cinematographic records as herein described may represent highly advantageous wide fields of view, or composite wide scenes, as, for example, say, two or three adjoining rooms with action going on in each or the actors seen moving about from one room to another, or for the presentation of comedy, drama, and other productions accompanied by frequent interest-increasing dialogue or other important side words.

As illustrating how the invention may be carried into practice two sheets of drawings are appended hereto, in one of which the improved cinematograph film, that is with record-bearing side wings and parts of a cinematograph projector are shown, and the other sheet of drawings consists of diagrammatic views of a cinematograph projector and of cinematograph screens arranged in accordance with this invention.

Referring to the drawings wherein is set forth a preferred embodiment of my invention:

Figure 1 is a fragmentary view of a three-row film.

Figure 2 is a modified form of the film shown in Figure 1.

Figure 3 is a further modification of Figure 1.

Figure 4 is a still further modification of the showing in Figure 1.

Figure 5 is a rear elevation of the film gate.

Figure 6 is a top plan view of Figure 5.

Figure 7 is a detail plan view of an interchangeable gate door.

Figure 8 is a detail view of a sprocket wheel.

Figure 9 is a side elevational view of a projector with my invention attached thereto.

Figure 10 is a detail view of a screen.

Figure 11 is a top plan view of Figure 10.

Figure 12 is a modification of the screen shown in Figure 10.

Figure 13 is a top plan view of Figure 12.

Figure 14 is a top plan view of a projector showing my invention attached thereto.

At Fig. 1 is shown a cinematograph film comprising a centre or main picture rank marked $a$, and two narrower wing or side ranks of records $b, b$. The ranks $a, b, b$ are separated by pressure guide or running parts $c, c$ and there are also two edge or marginal running parts $c^1, c^1$. Alongside the main rank $a$ are formed driving perforations $d, d$ of about ordinary standard size, pitch, and separation, and also in the running parts $c, c$ but nearer to the side ranks are formed "flexing perforations" $f, f$ of any standard or other convenient size and arrangement which will allow of, or facilitate, the necessary slight or suitable angling or turning of the wing or side record parts $b, b$ so that they may be directly projected upon the hereinafter named side screens.

Variations of the shape, size and arrangement of the flexible perforations $f, f$ are shown at Fig. 2 where they are of a different shape to the driving perforations $d, d$.

In Fig. 3 a further modification is shown of a difference in the flexing perforations and illustrations one of the many ways possible where the flexing perforations $f, f$ may differ from the ordinary driving perforations $d, d$.

At Fig. 4 is shown a film like Fig. 1, but in which the edge or marginal spaces $c^1, c^1$ are made wider and are perforated with holes $e, e$ for driving or registering purposes, and the said holes are of standard or other size and pitch. Each side rank $b, b$ is made of any suitable width but not in any case as wide as the main rank $a$. A convenient width for such narrow side ranks $b, b$ is, say,—but not necessarily so,—about one half or three quarters the width of the main rank $a$.

Figs. 5 and 6 are an elevation and a plan view respectively of the triple-apertures gate $g$ of a cinematograph projector arranged in accordance with the present invention, and having a portion of a film similar to that shown in Fig. 1 therein, $a^1$ being the main gate aperture with a main record part $a$ of the improved film in position, and $b^1, b^1$ the two narrower side gate apertures say, each about half the width of the main gate aperture and with side record parts $b, b$ of the improved film in position. $h$ is a hinge or other joint and $i$ a hinge-pin or pivot on which the gate door $g^1$ turns. If desired this gate door is made detachable from the gate $g$ by the removal of the hinge pin or pivot $i$ from the hole marked $j$ in the hinge.

Referring to Fig. 6, $k, k$ are spring or spring-pressed pressure guide pieces suitably attached to the gate door $g^1$ by screws or in any other convenient manner to guide or flatten the centre or main part of the film in conjunction with other guide pieces $l, l$. $m, m$ are guide pieces adapted to cause the edge or side parts of the improved film,—when within the gate $g$,—to be a little out of line with the main part $a$ of the film so that when the side record parts $b, b$ are respectively within the side gate apertures $b^1, b^1$ the said side record parts of the improved film will suitably face towards the respective side projection lenses $v^1, v^1$ and the corresponding side screens. If desired guide or projecting pieces $n, n$ may also be employed.

Fig. 7 is a plan view of a separate or interchangeable gate door $g^2$, which is provided and adapted to be readily substituted for the triple-apertured gate door $g^1$ when an ordinary standard film is to be projected by the projection lens $v$ on to the main screen 1 or 1ª. $a^1$ is a gate-aperture and $o, o$ and $p, p$ are guide pieces spaced for an ordinary standard film. Each gate door that is employed is hinged or pivoted so as to open rearwardly as shown, or it is arranged to open forwardly; also instead of the gate being straight or parallel as shown at Figs. 6 and 7, both the gate and the gate door,—or doors,—may each have their side-apertured parts made or set at an angle as shown, for example, in the gate $g$, Fig. 14.

At Fig. 8 is outlined a sprocket wheel $s$ which is employable both for the improved film and for ordinary standard film providing sufficient space is made for the overhanging side portions of the improved film. *r, r* are a pair of ordinary or standard sprocket rims and *t, t* sprocket teeth thereon. If desired, the sprocket wheel *s* or each sprocket wheel that is employed in the projector may be extended as indicated by the dotted lines *q, q*. If the film has more than two rows of perforations suitable for driving or registering purposes, as, for example, say, as shown in Fig. 4, the sprocket wheel *s* or each sprocket wheel that is employed in the projector may have more than two sprocket rims or more than two sets of sprocket teeth to suit.

Fig. 9 is a diagrammatic side view of a projector adapted for use with the improved film in which *g* is the gate, *s, s* feed and take up sprocket wheels, $s^1$ an intermittent sprocket wheel when a Maltese cross movement or machine is employed, *u* is a wide three-sector rotary shutter, *v* the centre or main projection lens, *w* an arc or other source of light, and *x* the main condenser.

Fig. 10 outlines an ordinary or other proportioned main picture screen 1, and 2, 2 are two separate narrower side screens, each having a border 3 around it.

Fig. 11 is a plan view of Fig. 10 but with the borders removed. In this view each side screen 2, 2 is formed, or set at an angle to the centre or main screen 1.

Fig. 12 illustrates a modified and preferable arrangement of screens. In this arrangement a wide screen is divided by two vertically-arranged intermediate borders 4, 4, which in effect form a centre or main screen $1^a$ and two narrower side screens $2^a$, $2^a$. The separating borders 4, 4 preferably are wide enough for the nearly-meeting edges of juxtaposed pictures to edge or border upon and yet narrow enough to allow of a centre and two side pictures appearing almost as one wide moving picture.

Fig. 13 is a plan of Fig. 12 without borders, and illustrates as in plan view Fig. 11 the two side screens $2^a$, $2^a$ are each at an angle to the main screen $1^a$.

Fig. 14 is a part plan view of the projector diagrammatically shown at Fig. 9 in which *v* is the centre projection lens for directly projecting the main records or film sections *a* upon the main screen $1^a$. $v^1$, $v^1$ are two angularly-placed side projection lenses for projecting the respective side records *b, b* directly upon the corresponding angularly-placed side screens $2^a$, $2^a$. The side record parts *b, b* of the improved film when passing through the gate *g* are momentarily and suitably turned a little from the flexing perforations *f, f* so that when within the side gate apertures $b^1$, $b^1$ they are suitably facing towards the respective side projection lenses $v^1$, $v^1$ and the corresponding side screens $2^a$, $2^a$ as hereinbefore described. In this diagram the side apertured parts $b^1$, $b^1$ of the gate *g* are shown set at an angle, but if desired both the gate *g* and the gate door $g^1$ may be made straight or parallel as shown in the plan view Fig. 6. *u,*—also shown at Fig. 9,— is a rotary shutter which is of any ordinary and suitable kind but made wide enough to act in front of all three projection lenses at the same time. *w* is an arc or other source of light having before it a main condenser *x* for the main gate aperture $a^1$ and the main record parts *a* of the improved film. $x^1$, $x^1$ are two angularly-placed side condensers from which the light is directed to the respective side gate apertures $b^1$, $b^1$ by means of a number,—say, four,—of adjustable or other side reflectors,—each reflector is marked *y,*—and two light-shields *z, z* adapted to confine the action of each projection lens to its own gate aperture are fitted, when required, in position by any convenient means.

It will be seen that by reason of the present invention, a film having a row of images for each of the condensers is provided, which consists of a center rank of pictures *a*, of standard area and with narrower side ranks of records *b* separated from the central rank by spaces *c* in which two or more lineal rows of perforations are provided. One row of perforations *d* serves for driving the film, and the other perforations *f*, which may be of any desired shape, serve to facilitate flexing of the film in the gate of the projector. Obviously the flexing perforations of the film may, when found desirable, be dispensed with, without materially affecting the operation of the apparatus. The records *b* may be pictures or descriptive matter such as sub-titles or dialogue.

Additional driving perforations may be provided along the margins at the outer edge $c^1$, and a sprocket-wheel for driving such a film is provided with the necessary additional teeth. Figure 6 shows one construction of gate in which the pressure guide members *k, l, m, n,* are so arranged as to flex the film to cause the side records *b* to face towards side projection lenses $v^1$, Figure 14, set at an angle to the main lens *v*, and side projection screens $2^a$, Figure 13, set at an angle to the main screen $1^a$.

The hinged door $g^1$ of the gate is removable and may be replaced by a door $q^2$ Figure 7, formed with guide pieces *o, p* suitable for use with an ordinary standard film. Light from the projecting lamp *w* passes to the central records *a* through a condenser *x* and to the side records *b* through side condensers $x^1$ used in conjunction with reflectors *y*. The side screens $2^a$ may be separated from or integral with the main screen $1^a$ and may be fitted with outer borders adapted to be moved inwardly to form borders for the screen $1^a$ when a standard film is to be projected. In this case, curtains attached to the borders cover the screens 2ª which are out of use.

What I claim is:—

1. A device of the class described having in combination a common light source, a series of angularly disposed condensers, a film gate, a film having a row of images for each of said condensers and adapted to pass through said film gate, a reflector between each outer condenser and the film gate for directing the rays from the outer condensers to the outer rows of images, and the rays from the inner condenser proceeding directly to the film gate.

2. A device of the class described having in combination a common light source, a series of concentrically positioned condensers, a film gate, a film having a row of images for each of said condensers and adapted to pass through said film gate, a reflector between each outer condenser and the film gate for directing the rays from the outer condensers to the outer rows of images, and the rays from the central condenser proceeding directly to the film gate.

3. A device of the class described having in combination, a common light source, a main condenser, a condenser positioned on each side of the main condenser at an angle thereto, a film gate, a film having a row of images for each of said condensers and adapted to pass through said film gate, a reflector between the side condensers and the film gate for directing rays from the side condensers to their respective rows of images.

4. A device of the class described having in combination a common light source, a plurality of condensers, a film gate, a film having a row of images for each of said condensers and adapted to extend through said film gate, reflectors between the condensers and film gate, a rotary shutter, a series of projection lens between said shutter and the film gate, and a sectional screen for receiving the images.

5. A device of the class described having in combination a common light source, a plurality of condensers, a film gate, a film having a row of images for each of said condensers and adapted to extend through said film gate, reflectors between the condensers and film gate, a rotary shutter, a series of projection lens between said shutter and the film gate, and a sectional screen having its outer sections smaller than its central section and arranged at an angle thereto.

6. A device of the class described having in combination a screen provided with a series of separate sections, lenses for projecting images on each of said sections, a rotary shutter in front of said lenses, a plurality of condensers, a film gate having a plurality of apertures therein, a film having a row of images for each of said condensers, and adapted to pass through said gate, the side ranks of the film being of smaller width than the central rank, and a pair of reflectors between the condensers and the film gate.

7. A device of the class described having in combination a main screen, a lens for projecting images on said main screen, side screens, a pair of lenses for projecting images on said side screens, a rotary shutter in front of said lenses, a film gate having a series of apertures therein, a plurality of condensers, a film having a row of images for each of said condensers, and adapted to pass through said main gate and aligned with the apertures therein, and a pair of reflectors between each of the side condensers and the film gate.

8. A device of the class described having in combination a main screen, a lens for projecting images on said main screen, side screens, a pair of angularly disposed lenses for projecting images on said side screens, a rotary shutter in front of said lenses, a film gate having a series of apertures therein, a plurality of condensers, a film having a row of images for each of said condensers, and adapted to pass through said main gate and aligned with the apertures therein, and a pair of reflectors between each of the side condensers and the film gate.

FREDERIC WILLIAM DICKINSON.

Witnesses:
 ALICE M. TURNER,
 E. EVELINE MELLON.